United States Patent [19]

Yuhas, Jr. et al.

[11] Patent Number: 4,575,568

[45] Date of Patent: Mar. 11, 1986

[54] REMOVAL OF PHENOLS FROM WATER

[75] Inventors: Stephen A. Yuhas, Jr., Fords; Denise Lopez, South Amboy, both of N.J.

[73] Assignee: Exxon Research & Engineering Co., Florham Park, N.J.

[21] Appl. No.: 674,262

[22] Filed: Nov. 23, 1984

[51] Int. Cl.$^4$ .................. C07C 37/72; C07C 37/70
[52] U.S. Cl. .................................. 568/749; 568/750
[58] Field of Search ...................... 568/749, 750, 753

[56] References Cited

U.S. PATENT DOCUMENTS

| | | | |
|---|---|---|---|
| 2,790,834 | 4/1957 | Morton et al. | 568/749 |
| 2,807,654 | 9/1957 | Grimmett et al. | 568/749 |
| 2,863,927 | 12/1958 | Parisse | 568/750 |
| 3,235,607 | 2/1966 | Fritzsche et al. | 568/749 |
| 3,337,642 | 8/1967 | Hoefs et al. | 568/750 |
| 3,392,090 | 7/1968 | Parisse | 210/909 |
| 4,025,423 | 5/1977 | Stonner et al. | 568/749 |
| 4,179,365 | 12/1979 | Sumi | 568/749 |
| 4,503,267 | 3/1985 | Pavin | 568/753 |

FOREIGN PATENT DOCUMENTS

| | | | |
|---|---|---|---|
| 0150351 | 8/1981 | Fed. Rep. of Germany | 568/749 |
| 0151442 | 10/1981 | Fed. Rep. of Germany | 568/749 |
| 0035387 | 9/1978 | Japan | 568/749 |
| 876452 | 9/1959 | United Kingdom | 568/749 |

OTHER PUBLICATIONS

H. J. Wurm, Preprint 23, Industrial Waste Conference, Purdue University, pp. 1054–1073 (1968).
M. R. Beychok, ACS Div. Fuel Chem. Prepr., vol. 19, No. 5, pp. 85–93, (1974).
R. G. Edmonds et al., Chemical Engineering Progress, vol. 50, No. 3, pp. 111–115, (Mar. 1954).
P. R. Kiezyk et al., The Canadian Journal of Chemical Engineering, vol. 49, pp. 747–752, (Dec. 1971); vol. 51, pp. 741–745 (Dec. 1973).
D. C. Greminger et al., Ind. Eng. Chem Process Des. Dev., vol. 21, pp. 51–54 (1982).
N. H. Kirchgessner, Sewage and Industrial Wastes, vol. 30, No. 2 (1958).

*Primary Examiner*—Werren B. Lone
*Attorney, Agent, or Firm*—Jack B. Murray, Jr.

[57] ABSTRACT

In a process for purification of wastewater streams containing phenolic impurities wherein the wastewater stream is contacted with an ether extraction solvent for the extractive removal of the phenolic impurities, to form an ether extract phase containing at least a portion of the phenolic impurities and an aqueous raffinate phase depleted in the phenolic impurities, the improvement which comprises effecting the separation of the phases in the presence of a phase separation promoting amount of at least one polyhydric alcohol.

11 Claims, No Drawings

REMOVAL OF PHENOLS FROM WATER

BACKGROUND OF THE INVENTION

This invention relates to an improved process for recovering phenols from aqueous streams, and more particularly, to an improved process for employing ether extraction of phenols from such mixtures.

DESCRIPTION OF THE PRIOR ART

Various methods for removal of phenols from wastewater streams, to permit disposal of purified water streams, are widely practiced in the industry in connection with such processes as coal gasification and the like.

It is known that phenols can be removed from such aqueous streams by extraction using ethers such as isopropyl ether, to extract the phenols into the resulting ether phase, which, following phase separation, can be treated by distillation to recover a lean ether solvent for reuse. A crude phenols stream is thereby obtained which can then be further distilled, to remove and recover residual ether solvent, and to form a bottoms stream further enriched in phenols which can be withdrawn from the process.

A small part of the ether extraction solvent remains in the aqueous raffinate phase recovered from the extractor-separator. This ether solvent can be recovered from the aqueous phase by gas scrubbing.

An ether extraction process for phenol recovery has been developed by Lurgi which utilizes isopropyl ether, and is known as the Phenosolvan process, H. J. Wurm, Preprint 23, Industrial Waste Conference, Purdue University, pages 1054–1073 (1968); M. R. Beychok, *ACS Div. Fuel Chem. Prepr.*, Vol. 19, No. 5, pp. 85–93 (1974). R. G. Edmonds et al., *Chemical Engineering Progress*, vol. 50, No. 3, pages 111–115, (March 1954); N. H. Kirchgessner, *Sewage and Industrial Wastes*, Vol. 30, No. 2 (1958); P. R. Kiezyk et al., *The Canadian Journal of Chemical Engineering*, Vol. 49, pp. 747–752 (December, 1971), and Vol. 51, pp. 741–745 (December 1973); and D. C. Greminger et al., *Ind. Eng. Chem. Process Des. Dev.* (1982), Vol. 21, pp. 51–54.

U.S. Pat. No. 2,790,834 relates to a process for separating phenolic compounds from mixtures thereof with hydrocarbons by employing an extraction solvent selected from the group of glycerol, ethylene glycol, diethylene glycol and triethylene glycol.

U.S. Pat. No. 2,863,927 relates to the recovery of purified di-tertiary-butyl-para-cresol from its admixtures with related chemical compounds by use of a liquid glycol, glycerine, or mixtures thereof.

U.S. Pat. No. 3,337,642 uses ethylene glycol as a solvent for purification of crude 2,6-dimethyl phenol by crystallization at low temperatures.

U.S. Pat. No. 3,392,090 discloses a process for separation of alkyl phenols by azeotropic distillation with an alkane diol.

SUMMARY OF THE INVENTION

In a process for purification of wastewater streams containing phenolic impurities wherein the wastewater stream is contacted with an ether extraction solvent for the extractive removal of the phenolic impurities, to form an ether extract phase containing at least a portion of said phenolic impurities and an aqueous raffinate phase depleted in said phenolic impurities, the improvement which comprises effecting the separation of said phases in the presence of a phase separation promoting amount of at least one polyhydric alcohol.

DETAILED DESCRIPTION OF THE INVENTION

The improved process of this invention provides a method for rapidly reducing the thickness of the interfacial foam layer which is obtained during extraction of phenol impurities from aqueous waste streams thereof employing ether extraction solvents. It has been found that the addition of small amounts of polyhydric alcohols to the ether extraction solvent either prior to or during extraction greatly speeds the disappearance of the interfacial foam layer and aids in disengagement of the resulting liquid phases.

Wastewater streams which are conventionally treated by ether extraction solvents for removal of phenolic impurities therefrom can be obtained from a wide variety of sources, such as wastewater streams produced in coal gasification plants, coke oven plants, phenolic resin plants and the like. The phenolic impurities which are present in such a wastewater stream can therefore vary widely, and will typically comprise benzene, naphthalene and other polynuclear aromatic compounds, alkylated derivatives of the foregoing and hydroxy-substituted derivatives of each of the above. The concentration of the phenolics in the wastewater streams can also vary widely, e.g., from about 500 ppm to 3 wt.%.

The ether extraction solvents which can be used are conventional, with diisopropyl ether being the most widely used ether solvent. Other ether solvents which can be employed include methyl tertiary butyl ether, di-secondary-butyl ether, ethyl isopropyl ether and the like.

The ether extraction solvent is used in a solvent extracting amount (generally from about 0.05 to 1.0 parts by weight, and more typically of from about 0.1 to 0.5 parts by weight, of ether extraction solvent per part by weight of the wastewater stream). The ether extraction solvent and wastewater stream are contacted in conventional liquid/liquid extraction equipment, typically with mixing energy imparted thereto by means of conventional agitation devices. The extraction can be performed in a countercurrent or cocurrent manner, and in a batchwise, continuous or semicontinuous operation. The extraction zone can comprise a single extraction vessel or a series thereof.

The temperature of the extraction can vary widely, and will be generally from about 0° to 100° C., and more typically of from 30° to 50° C. The pressure used in the extraction zone can also vary widely and is also not critical. Generally, pressures of from about 0 to 700 kPa will be suitable.

During agitation of the ether solvent and the wastewater stream (e.g., agitation resulting from stirring or turbulence created in contacting of the ether solvent and the wastewater stream), an interfacial foam is known to form between the organic and aqueous phases. The rate of separation of the organic and aqueous phases formed in the extraction zone will depend on the thickness and rate of disappearance of this interfacial layer which forms between the distinct organic and aqueous phases.

It has been found that polyhydric alcohols, when added to the liquid mixture containing the above organic and aqueous phases, greatly speeds the disappearance of this interfacial foam layer, and reduces the time required to obtain disengagement of the liquid phases. The polyhydric alcohols which can be employed in this invention comprise dihydric and trihydric alcohols and alcohol ethers having from 2 to 6 carbon atoms per molecule, and preferably vicinal diols of 2 to 6 carbon atoms (which can contain one or more additional hydroxy groups). Examples of such polyhydric alcohols are ethylene glycol, propylene glycol, 1,3-propane diol, 1,2-butane diol, cis- and trans-1,2-cyclohexane diol, diethylene glycol, triethylene glycol, hexylene glycol and the like.

Especially preferred polyhydric alcohols for use in this invention are alkylene glycols having from 2 to 4 carbon atoms per molecule, and illustrative of these especially preferred polyhydric alcohols are ethylene glycol and propylene glycol.

The selected polyhydric alcohol should be employed in an amount effective to promote the rate of disappearance of the interfacial foam layer, and will generally range from about 10 ppm to about 1,000 ppm, and preferably from about 100 to 700 ppm, by weight, based on the quantity of the ether extraction solvent employed.

The polyhydric alcohol can be added to the ether extraction solvent prior to the extraction zone. Alternatively, the polyhydric alcohol can be admixed with the wastewater stream containing phenol impurities before the extraction zone, or it can be added to the extraction zone directly. Finally, if a mixture of the organic and aqueous phases is withdrawn as product from the extraction zone and is intended for being passed to a settling zone for phase separation, the polyhydric alcohol of this invention can be introduced to the two-phase liquid mixture prior to introduction of the two-phase mixture into the settling zone, or the polyhydric alcohol can be introduced into the settling zone itself.

The extent to which the interfacial foam layer disengagement will be promoted will depend on the particular polyhydric alcohol employed, the amount thereof, the temperature of the settling zone and the like. Generally, however, the phase disengagement will be promoted by a rate of at least 50 percent, and preferably from about 100 to 5,000 percent (as determined by observing the time required for disappearance of the interfacial foam layer once formed).

The conditions of temperatures and pressure which are employed in the phase separation zone, e.g., the settling zone, can also vary widely, and will generally be from about 0° to 100° C. (more preferably from about 30° to 50° C.) and pressures of from about 0 to 700 kPa.

The thus-separated ether extract phase, containing at least a portion of the phenolic impurities extracted from the wastewater stream, and the aqueous raffinate phase, which is depleted in these phenolic impurities, can be separated from the liquid separation zone in a conventional manner. The separated ether extract can then be treated, if desired, for separation of the ether extraction solvent and a recycle thereof for extraction of additional phenolic impurities. The thus-separated phenolic impurities stream, also containing the polyhydric alcohol, can then be disposed of in the conventional manner.

The process of this invention can be further illustrated by reference to the following examples.

EXAMPLES 1-4

A series of mixtures of diisopropyl ether, distilled water, phenol and ethylene glycol were made employing the amounts necessary to achieve the weight percent concentrations indicated in Table 1 below. Thereafter, each of these liquid mixtures contained in a 1 liter glass vessel were vigorously mixed with an air motor stirrer for one minute, and then the organic and aqueous phases were allowed to separate by settling. The rate of disappearance of the interfacial foam layer was measured as a function of time. The data thereby obtained are set forth in Table 2 below.

TABLE 1

| | Test Formulations, Grams | | | |
|---|---|---|---|---|
| | A | B | C | D |
| Diisopropyl Ether | 30 | 30 | 30 | 30 |
| Water (distilled) | 70 | 70 | 70 | 70* |
| Phenol | 0.1 | 0.1 | 0.1 | 0.1 |
| Ethylene Glycol | 0 | 0.004 | 0.02 | 0.02 |
| Total Weight (gms) | 100.1 | 100.104 | 100.12 | 100.12 |

*tap water

TABLE 2

| | Rate of Disappearance of Interfacial Foam Width of Interfacial Foam Layer, cm. | | | |
|---|---|---|---|---|
| Time, sec.(a) | A | B | C | D |
| 10 | 0.76 | 0.64 | 0.38(b) | 0.38(b) |
| 30 | 0.38 | 0.13 | Paper Thin | Paper Thin |
| 60 | 0.25 | 0.05 | None(c) | None(c) |
| 90 | 0.13 | 0.02 | " | " |
| 120 | 0.05 | Paper Thin | " | " |
| 180 | Paper Thin | " | " | " |
| 300 | " | " | " | " |
| 420 | " | " | " | " |
| 600 | " | None | " | " |
| 1200 | " | " | " | " |
| 1800 | " | " | " | " |

(a)Zero time at time the stirrer is stopped.
(b)At the 10 second mark, the foam layer was disappearing very rapidly.
(c)Foam layer disappeared in 40 seconds.

Therefore, it can be seen that the addition of ethylene glycol greatly promotes the rate of disappearance of the interfacial foam layer.

The addition of the ethylene glycol resulted in the following increased rates of phase disengagement (assuming disappearance of the foam layer in Run A at 1800 seconds).

| Run | Increase |
|---|---|
| A | — |
| B | 300% |
| C | 3,000% |
| D | 3,000% |

It will be obvious that various changes and modifications may be made without departing from the invention and it is intended, therefore, that all matter contained in the foregoing description shall be interpreted as illustrative only and not limitative of the invention.

What is claimed is:

1. In a process for purification of wastewater streams containing phenolic impurities wherein the wastewater stream is contacted with an ether extraction solvent for the extractive removal of the phenolic impurities, to form an ether extract phase containing at least a portion of said phenolic impurities and an aqueous raffinate phase depleted in said phenolic impurities, the improvement which comprises effecting the separation of said phases in the presence of a phase separation promoting amount of at least one polyhydric alcohol selected from the group consisting of glycols and glycol ethers having from 2 to 6 carbon atoms per molecule.

2. The improved process according to claim 1 wherein said polyhydric alcohol comprises ethylene glycol or propylene glycol, and wherein said polyhydric alcohol is employed in an amount of from about 10 to 1,000 ppm, based on the weight of said ether extraction solvent.

3. The improved process according to claim 2 wherein said ether extraction solvent comprises diisopropyl ether.

4. In a process for purification of wastewater streams containing phenolic impurities wherein the wastewater stream is contacted with an ether extraction solvent for the extractive removal of the phenolic impurities, to form an ether extract phase containing at least a portion of said phenolic impurities and an aqueous raffinate phase depleted in said phenolic impurities, the improvement which comprises effecting the separation of said phases in a liquid separation zone to which is added a phase separation promoting amount of at least 1 polyhydric alcohol.

5. The improved process according to claim 4 wherein said polyhydric alcohol comprises at least one member selected from the group consisting of glycols and glycol ethers having from 2 to 6 carbon atoms per molecule.

6. The improved process according to claim 4 wherein said polyhydric alcohol comprises ethylene glycol or propylene glycol, and wherein said polyhydric alcohol is employed in an amount of from about 10 to 1,000 ppm, based on the weight of said ether extraction solvent.

7. The improved process according to claim 6 wherein said ether extraction solvent comprises diisopropyl ether.

8. In a process for purification of wastewater streams containing phenolic impurities comprising benzene, polynuclear aromatic compounds, alkylated derivatives of the foregoing and hydroxy-substituted derivatives of each of the above, wherein the wastewater stream contains such impurities in an amount of from about 500 ppm to 3 wt.% and wherein the wastewater stream is contacted with an ether extraction solvent selected from the group consisting of diisopropyl ether, methyl tertiary butyl ether, disecondary butyl ether, and ethyl isopropyl ether, for the extractive removal of the phenolic impurities, to form an ether extract phase containing at least a portion of said phenolic impurities and an aqueous raffinate phase depleted in said phenolic impurities, the improvement which comprises effecting the separation of said phases in the presence of a phase separation promoting amount of at least one polyhydric alcohol selected from the group consisting of dihydric and trihydric alcohols and alcohol ethers having from 2 to 6 carbon atoms per molecule.

9. The improved process according to claim 8 wherein such polyhydric alcohol comprises a member selected from the group consisting of ethylene glycol, propylene glycol, 1,3-propane diol, 1,2-butane diol, cis- and trans-1,2-cyclohexane diol, diethylene glycol, triethylene glycol, and hexylene glycol.

10. The improved process according to claim 9 wherein said polyhydric alcohol is employed in an amount of from about 10 ppm to about 1000 ppm by weight, based on the quantity of said ether extraction solvent.

11. The improved process according to claim 10 wherein said polyhydric alcohol is employed in an amount of from about 100 to 700 ppm by weight, based on the quantity of said ether extraction solvent.

* * * * *